Reissued Aug. 7, 1951

Re. 23,396

UNITED STATES PATENT OFFICE 23,396

PREPARATION OF BETA-LACTONES

Benjamin Barnett, Santa Rosa, Calif., assignor to Shell Development Company, San Francisco, Calif., a corporation of Delaware No Drawing. Original No. 2,513,615, dated July 4, 1950, Serial No. 792,839, December 19, 1947. Application for reissue November 3, 1950, Serial No. 194,010

6 Claims. (Cl. 260—344)

Matter enclosed in heavy brackets [ ] appears in the original patent but forms no part of this reissue specification; matter printed in italics indicates the additions made by reissue.

The present invention relates to an improved process for preparing the beta-lactones of beta-hydroxyalkanoic acids. More particularly the invention provides an improved synthesis of valuable beta-hydroxyalkanoic acids since the corresponding beta-lactones are readily hydrolyzed to the acids. The present improvement avoids the necessary employment of reaction temperatures below room temperatures (about 25° C.), and avoids the numerous side reactions that inherently occurred in the methods of synthesis heretofore employed, particularly in the preparation of beta-lactones containing relatively large numbers of carbon atoms.

Early in the twentieth century Staudinger, Ber. 41 1355 (1908), reported that a beta-lactone was produced by a reaction between diphenyl-ketene and quinone, but that similar products were not obtained from the employment of unsubstituted ketene.

The ketenes are a special class of ketones which undergo many reactions that are non-analogous to those of the general class of carbonyl compounds due to the presence of the unique structural arrangement, C=C=O, in their molecules. They are classified into aldoketenes, RCH=C=O and ketoketenes $R_2C=C=O$ in which each R represents a hydrocarbon radical.

The work of Staudinger above indicated that since the ketoketene, diphenylketene, would add to a carbonyl group to form a beta-lactone while unsubstituted ketene would not, that such additions were limited to the disubstituted ketenes. However, in 1933, Hurd and Thomas, J. Am. Chem. Soc. 55 275 (1933), published their findings that ketene itself would react with the carbonyl groups of aromatic aldehydes, but primarily formed a mixed acetic anhydride with only a minor amount of a beta-lactone which was readily decomposed by heat to an arylethylene and $CO_2$ under the conditions of the reaction. In 1944, Kung obtained U. S. Patent 2,356,459, describing the production of beta-lactones by the reaction at temperatures below 25° C. of low molecular weight saturated aldehydes with low molecular weight ketenes in the presence of a Friedel-Crafts catalyst. The decomposition of the lacetone was thus avoided by the low reaction temperature. Since that time numerous patents have issued employing the general reaction of ketenes with carbonyl compounds to form various unsaturated esters and ketones, but the problem of producing high yields of beta-lactones from the higher molecular weight (therefore less reactive) carbonyl compounds [)] remained.

Elevated temperatures are generally required to obtain a practical rate of reaction when compounds of a relatively high molecular weight are employed. In the presence of the catalysts heretofore employed for the addition reaction, a temperature high enough to obtain a practical rate of reaction results in the decomposition of the lactones formed from higher molecular weight aldehydes into hydrocarbons and carbon dioxide almost as rapidly as the lactones are formed. Since still higher temperatures are required in the absence of catalysts similar decompositions occur, except in isolated cases such as the reaction between diphenylketene and quinone reported by Staudinger.

It is therefore an object of the present invention to provide an improved synthesis of beta-lactones (which is in effect also a synthesis of beta-hydroxy acids) that is not necessarily limited to the employment of low molecular weight starting compounds. Another object is to provide a method of initiating an addition reaction between a carbonyl compound and a ketene in an essentially non-ionic reaction system. A further object is to provide a method of adding ketenes to carbonyl compounds to produce beta-lactones at a moderately elevated temperature substantially in the absence of decomposition of the lactone formed and in the substantial absence of side reactions. Still other objects and advantages of the present process will be apparent from the following description.

The above and other objects of the invention are accomplished by virtue of the discovery that although beta-lactones, particularly those of a higher molecular weight, readily decompose at elevated temperatures high enough to bring about the reaction of the corresponding carbonyl compound with ketene in the absence of a catalyst or in the presence of an ionic catalyst, when the reaction is conducted in an essentially non-ionic system while free radicals are being formed in the same phase of the reaction system, elevated reaction temperatures up to about 200° C., surprisingly result in the formation of vastly improved yields of beta-lactones.

The invention is described and illustrated with particular reference to the employment of unsubstituted ketene, and its employment is preferred. However, the alkanyl, aryl or cycloalkanyl derivatives of ketene including both the aldoketenes and ketoketenes, i. e., any ketene in which the structural arrangement C=C=O contains the only aliphatic multiple linkages, may similarly be employed, and such ketenes will be referred to throughout the specification and claims as, "aliphatically saturated ketenes." *Among the aliphatically saturated ketenes, the aliphatic ketenes that, apart from the unsaturation of the C=C=O group, contain only saturated bonds, e. g., ketene and its homologs, may be distinguished and will be referred to herein as "saturated aliphatic ketenes."* Illustrative examples of particular ketenes suitable for employment include, ketene, methylketene, methylbutylketene, ethylisopropylketene, amylketene, diheptylketene, ethylcyclohexyl ketoketene, bis(trimethylcyclohexyl) ketene, phenylcyclohexyl ketoketene, dimethylphenyl aldoketene and decyl phenyl ketoketene.

The alkanals (saturated aliphatic aldehydes) are particularly active carbonyl compounds for employment in the present process, but the aryl and cycloalkanyl aldehydes may also be suitably employed as well as the dialkanyl, arylalkanyl, cycloalkanyl, diaryl, dicycloalkanyl, and aryl cycloalkanyl ketones, i. e., carbonyl compounds in which the carbonyl group contains the only aliphatic multiple linkages, which carbonyl compounds will be referred to throughout the specification and claims as, "aliphatically saturated carbonyl compounds." Illustrative examples of particular carbonyl compounds which may be suitably employed in the present process include, heptanal, caproaldehyde, pentadecanal, butyraldehyde, propionaldehyde, acetaldehyde, benzaldehyde, tolualdehyde, mesitylenic aldehyde, cyclohexanal, 3-methylcyclohexanal, 3,3,5-trimethylcyclohexanal, acetone, dipentadecyl ketone, dibutyl ketone, amyl butyl ketone, methyl pentadecyl ketone, acetophenone, methyl tolyl ketone, methyl mesityl ketone, cyclohexyl pentadecyl ketone, methyl cyclohexyl ketone, cyclohexyl phenyl ketone, diphenyl ketone, dicyclohexyl ketone, and the like.

Examples of alkanals, the preferred carbonyl starting compounds for the present process, include, heptanal, octanal, 3,4-dimethylpentanal, 2,3-dimethylbutanel, pelargonic aldehyde, caprylic aldehyde, undecoyl aldehyde, butanal, propionaldehyde, pentadecanal, acetaldehyde, and the like.

The reaction is not dependent upon the physical characteristics of the reactants and may be conducted in the presence or absence of an inert solvent such as benzene, toluene, naphtha or the like and under elevated or reduced pressure. Thus solids, volatile or viscous liquid reactants may be employed. However, as a practical matter, in view of the cost and availability of organic compounds containing large numbers of carbon atoms, it is preferable to employ carbonyl compounds and ketenes in which the hydrocarbon radicals attached to the functional groups C=O and C=C=O, respectively, contain not more than about 15 carbon atoms.

In the present process the most suitable temperature to be employed depends primarily upon the peroxide or other source of free radicals to be employed. Where, however, the reactivity of a particular carbonyl or ketene reactant or the lactone to be produced requires the use of temperatures within a particular range, this may readily be accomplished by choosing a source of free radicals most suitable for that particular range. By an appropriate choice of reaction initiating materials temperatures from as high as about 200° C. to as low as 0° C. or less may suitably be employed. However, where carbonyl-compounds of $C_7$ and above are employed it is preferable to choose reaction initiating materials effective at temperatures between about 50° C. to 150° C. such as the use of actinic radiations, benzoyl peroxide at between 70° C. to 90° C., 2,2-bis(tertiary-butylperoxy)butane at between 80° C. to 170° C. or the like.

The reaction is preferably conducted in a homogeneous liquid phase reaction system in the presence or absence of an inert solvent, and it is of course most economical to employ normal atmospheric pressure. The reaction products may be readily separated by physical or chemical means, as for example, by a vacuum distillation or by the hydrolysis of the lactone to the acid and its extraction by an aqueous alkaline medium. The reaction is adaptable for batchwise or continuous processes, the unreacted carbonyl compounds being readily recoverable for recycling.

The reaction is initiated or sensitized by the formation of free radicals within the reaction mixture. A wide variety of methods and/or materials may be employed to provide the source of the free radicals. The free radical initiation of the reaction may be generically described as conducting the reaction in the presence of free radicals of the group comprising the free radicals formed by the decomposition of a "thermal-dissociating" compound at its dissociating temperature, and the free radicals formed by the decomposition of a "photochemical-dissociating" compound under the influence of actinic light radiations.

The terms "thermal-dissociating" and "photochemical-dissociating" as employed in the specification and claims refer to compounds having the property of undergoing decomposition into free radicals under the specified influences, i. e., at a temperature within a definite range or in the presence of light radiations of definite wave lengths. While free radicals are comparatively new compositions of matter, and no generic classification of them in the ordinary sense is known, their preparation and utilization is rapidly becoming very extensive. A recent text; "The Chemistry of Free Redicals," by W. A. Waters, published in 1946 by the Oxford University Press, defines free radicals as: "complexes of abnormal valency which possess additive properties but do not carry an electrical charge and are not ions."

Numerous compounds have been found to possess the property of forming free radicals (in each case being a chemical or photochemical property of a compound which is known by those skilled in the art or determinable by known methods) and by virtue of this property may suitably be employed as reaction initiators in the present process. For example, the reaction mixture may be exposed to light radiations having a wave length short enough (generally below about 3200 A) to be absorbed by the carbonyl compound employed as a reactant thus causing its dissociation into free radicals. Similarly, by incorporating into the reaction mixture about 5 molar percent or less of a compound (such as acetone) which is dissociated by light radiations of a longer wave length, the free radicals may be formed by a source of light more nearly approaching the visible spectrum. In either of the above cases, any desired reaction temperature, even temperatures substantially below normal atmospheric, may be employed.

Compounds which are dissociated into free radicals by heat or actinic light, such as the organic peroxides, the metallo-alkyl compounds such as tetraethyl lead, the diazo compounds, the "positive halogen compounds" described by Robertson and Watson, J. Chem. Soc., April 1947, page 492, which include the N-chloroamides such as N,2,4-trichlorobenzonitrile, chloropicrin and the like, or still other sources of free radicals, may suitably be employed.

The organic peroxides form a particularly convenient source of free radicals as they are activated by a wide range of elevated temperatures, and their employment allows a close control of the reaction and does not require specialized apparatus.

U. S. Patent No. 2,379,218 describes numerous suitable organic peroxides and the recommended temperature ranges for their use, including:

| | °C. |
|---|---|
| Diethyl percarbonate | 45 to 70 |
| Allyl percarbonate | 50 to 80 |
| Benzoyl peroxide | 70 to 80 |
| Acetyl peroxide | 70 to 90 |
| Beta-chlorobenzoyl peroxide | 85 to 95 |
| Methyl n-amyl ketone peroxide | 110 to 135 |
| Methyl isobutyl ketone peroxide | 110 to 135 |
| Methyl n-propyl ketone peroxide | 115 to 140 |
| Methyl ethyl ketone peroxide | 115 to 140 |
| Acetone peroxide | 125 to 150 |
| Ethyl peroxide | 125 to 145 |
| Methyl isobutyl peroxide | 130 to 150 |
| Dicyclohexyl peroxide | 150 |

Of the organic peroxides, those in which the peroxide oxygen atoms are directly attached to one or more tertiary-alkyl radicals are especially suitable by virtue of their unusual stability during handling and storage. Illustrative examples of such tertiary-alkyl peroxides and their most effective temperature ranges include:

| | °C. |
|---|---|
| Di-tertiary-butyl diperoxalate | 0 to 40 |
| Di-tertiary-butyl-dipermalonate | 20 to 60 |
| 2,2-bis(tertiary-butylperoxy)butane | 80 to 120 |

The amount of added material employed to form the source of the free radicals may be varied over wide limits depending in each case upon the reactivity of the material and reactants employed. In general, amounts of an additive which form two moles of free radicals per mole of additive which correspond to from about 1 to about 5 molar percent based upon the total number of moles of reactant are sufficient. However, where relatively unreactive reactants are employed, or where substantial amounts of solvents or diluents are used, substantially larger amounts of the materials forming the source of free radicals may be employed.

The reaction embraced by the present process comprises a mole-to-mole addition, thus the reactants are preferably combined in substantially equimolar portions. However, whenever the cost, physical or chemical properties of either of the reactants render it practical or desirable to vary these proportions a substantial excess of either reactant may be suitably employed.

The following examples illustrate in detail, (1) a specific application of the process to the production of a particular beta-lactone, (2) the attempted production of the same lactone in the absence of free radical sensitization and (3) the effect of the presence of aliphatic carbon-to-carbon unsaturation in a carbonyl reactant employed in the process. As it is apparent that many variations of materials and reaction conditions employed are within its scope, the present invention is not limited to the particular reactants or conditions employed in Example I.

Example I.—The free radical sensitized reaction of a $C_7$ alkanal with ketene at about 85° C.

One mole of n-heptaldehyde was maintained at between 82° C. and 86° C. in the presence of 0.04 mole of benzoyl peroxide. Over a two hour period, at the rate of 0.51 mole per hour 1.02 moles of ketene were introduced. The reaction products were separated by a vacuum and a saponifiable reaction product was obtained in a 60% yield based on the weight of aldehyde employed. The unreacted aldehyde was readily recoverable for recycling. The reaction product was identified as beta-pelargonyl lactone by the following tests and analysis.

| Product | Property | Found | Theory |
|---|---|---|---|
| Pelargonyl β-lactone | per cent C | 70.19 | 69.19 |
| | per cent H | 9.77 | 10.33 |
| | per cent O | 20.04 | 20.48 |
| | mol. wt | 163 | 156 |
| | sap. no., equiv./100 g | 0.50 | 0.64 |
| | spectroscopic analysis (infra-red). | Present: lactone, some carbonyl | |
| | | Absent: alcohol | |
| β-Hydroxy pelargonic acid (hydrolysis product of pelargonyl β-lactone). | per cent C | 63.00 | 62.04 |
| | per cent H | 9.78 | 10.41 |
| | per cent O | 27.22 | 27.55 |
| | mol. wt | 181 | 174 |
| | acidity, equiv./100 g | 0.51 | 0.57 |
| | alcohol, equiv./100 g | 0.51 | 0.57 |
| | spectroscopic analysis (infra-red). | Present: chiefly COOH | |
| | | bands of COOH so strong as to make possible presence of OH or CO. | |

Example II.—The reaction of a $C_7$ alkanal with ketene in the absence of free radical sensitization at about 85° C.

A control experiment in which n-heptaldehyde and ketene were combined in the absence of added peroxide under the same reaction conditions resulted in but a 16% conversion of the aldehyde as compared to a 70% obtained in the presence of added peroxide. An analysis of the n-heptaldehyde revealed the presence of 0.002 equivalent per 100 grams of peroxide which would seem to account for the minor amount of acid (4%) found in the reaction product.

Example III.—The free radical sensitized reaction of an olefinically unsaturated aldehyde with ketene.

By analogy with the reaction of propionaldehyde with ketene, the main product expected with crotonaldehyde was 4-hexenyl β-lactone, which can be hydrolyzed and eventually dehydrated to sorbic acid. This lactone, however, was not obtained; the products were largely highly polymerized material containing also about 8% of acid stronger than dicarbonate ion. Sorbic acid could not be identified.

The experiment was carried out at 20° C. using di-tert-butyl-diperoxyoxalate as the catalyst. Ketene was introduced for 10 hours, at the rate of 0.5 mole per hour, into a solution of 140 g. (2 moles) of crotonaldehyde and 4.7 g. (0.02 mole) of the peroxide. The main products were separated into two neutral fractions, a clear, red oil and a brick-red solid, representing 73% and 19%, respectively, of the products.

While the present invention is not dependent upon a particular reaction mechanism or a certain series of intermediate steps, the general nature of the present reaction in respect to the class of carbonyl compounds and ketenes in which the C=O and C=C=O linkages contain the only aliphatic multiple linkages may be better understood from the following probable mechanism of the reaction, described for the reaction between n-heptaldehyde and ketene.

(1) A thermochemically or photochemically produced free radical removes an aldehydic-hydrogen atom from the carbonyl compound.

$$n\text{-}C_6H_{13}CHO \xrightarrow{\text{free radical}} n\text{-}C_6H_{13}\dot{C}{=}O$$

(2) A chain reaction is thereby initiated in which the heptanoyl free radicals adds to the methylidene group of ketene to form a diketo free radical which rearranges to the more saturated form containing a lactone ring structure.

$$n\text{-}C_6H_{13}\dot{C}{=}O + CH_2{=}C{=}O \longrightarrow$$

$$n\text{-}C_6H_{13}C{=}O \xrightarrow{\text{rearrangement}} n\text{-}C_6H_{13}\dot{C}{-}O$$

$$CH_2{-}C{=}O \qquad\qquad CH_2{-}C{=}O$$

(3) The free radical containing the lactone ring then removes an alpha-hydrogen atom from another carbonyl radical to form the beta-lactone reaction product and additional heptanoyl free radicals which continue the chain reaction by adding to other ketene molecules (Equation 2).

$$n\text{-}C_6H_{13}\dot{C}{-}O + n\text{-}C_6H_{13}CHO \longrightarrow$$

$$CH_2{-}C{=}O$$

$$n\text{-}C_6H_{13}CH{-}O + n\text{-}C_6H_{13}\dot{C}{=}O$$

$$CH_2{-}C{=}O$$

The mixed reaction products obtained when an unsaturated carbonyl compounds are thus explained since the presence of such unsaturated molecules provides in the reaction medium a second series of olefinic double bonds in addition to those contained in ketene thereby introducing many possible free radical addition reactions other than those outlined above.

I claim as my invention:

1. A process for the production of aliphatic β-lactones containing more than 8 carbon atoms, which comprises, heating a saturated aliphatic aldehyde containing at least 7 carbon atoms, in contact with a saturated aliphatic ketene and in contact with an amount furnishing at least 2 mole per cent based on the total moles of reactants of an organic peroxide having a decomposition temperature between about 50° C. and 150° C., to about the decomposition temperature of the peroxide.

2. In a process for the production of aliphatic β-lactones from aldehydes and ketenes, the improvement which comprises, heating a saturated aliphatic aldehyde, in contact with a saturated aliphatic ketene and in contact with an amount furnishing at least 2 mole per cent based on the total moles of reactants of an organic peroxide having a decomposition temperature of between about 0° C. and 200° C., to about the decomposition temperature of the peroxide.

3. In a process for the production of β-lactones from aldehydes and ketenes, the improvement which comprises, heating an aliphatically saturated aldehyde, in contact with an aliphatically saturated ketene and in contact with an amount furnishing at least 2 mol per cent based on the total moles of reactants of an organic peroxide having a decomposition temperature between about 0° C. and 200° C., to about the decomposition temperature of the peroxide.

4. In a process for the production of β-lactones from carbonyl compounds and ketenes, the improvement which comprises, heating to a temperature of from 0° C. to 200° C., an aliphatically saturated carbonyl compound, in contact with an aliphatically saturated ketene and at least 2 mole per cent based on the total moles of reactants of organic free radicals.

5. An improved preparation of pelargonyl beta-lactone which comprises the reaction of heptaldehyde with a substantially equimolar portion of ketene in the liquid phase and in the presence of from 1 to 5 mole percent of the total reactants of benzoyl peroxide at a temperature of substantially 85° C.

6. An improved preparation of pelargonyl beta-lactone which comprises the reaction of heptaldehyde with a substantially equimolar portion of ketene in the liquid phase and in the presence of from 1 to 5 mole percent of the total reactants of 2,2-bis(tertiary-butylperoxy)butane at a temperature of substantially 85° C.

BENJAMIN BARNETT.

REFERENCES CITED

The following references are of record in the file of this patent or the original patent:

UNITED STATES PATENTS

| Number | Name | Date |
|---|---|---|
| 2,379,218 | Dial | June 6, 1945 |
| 2,424,589 | Steadman et al. | July 29, 1947 |

OTHER REFERENCES

Hackh, "Chemical Dictionary," by Blaiston, 1944 (third edition), p. 468.